United States Patent [19]

Nakagawa et al.

[11] Patent Number: 5,289,496
[45] Date of Patent: Feb. 22, 1994

[54] METHOD AND SYSTEM FOR RADIO COMMUNICATION

[75] Inventors: Masao Nakagawa, Yokohama; Hiroyuki Yabuki, Kawasaki, both of Japan

[73] Assignee: Matsushita Electric Industrial Co., Ltd., Osaka, Japan

[21] Appl. No.: 660,074

[22] Filed: Feb. 25, 1991

[30] Foreign Application Priority Data

Mar. 2, 1990 [JP]   Japan ................................ 2-52147

[51] Int. Cl.⁵ ............................................ H04L 27/30
[52] U.S. Cl. ............................................ 375/1; 380/34; 375/106; 375/113
[58] Field of Search ................................ 375/106, 113

[56] References Cited

U.S. PATENT DOCUMENTS 4,977,578  12/1990  Ishigaki et al. .......................... 375/1

OTHER PUBLICATIONS

Robert C. Dixon, *Spread Spectrum Systems*, (John Wiley & Sons, 1984; pp. 224-226, "Transmitted-Reference Methods").

*Primary Examiner*—Bernarr E. Gregory
*Attorney, Agent, or Firm*—Lowe, Price, LeBlanc & Becker

[57] ABSTRACT

In a frequency hopped radio communication system wherein a control signal and a speech signal are transmitted together and the speech signal is transmitted via a predetermined set of frequency bands, method and apparatus are provided for converting the control signal into a corresponding RF control signal having a frequency spectrum lying in frequency bands separate from the predetermined set of bands. The frequency bands for the RF control signal may be between the predetermined set of frequency bands for the speech signal and may particularly be within guard bands established between the set of frequency bands for the speech signal.

12 Claims, 2 Drawing Sheets

METHOD AND SYSTEM FOR RADIO COMMUNICATION

BACKGROUND OF THE INVENTION

This invention relates to a method and a system for radio communication, for example, radio communication between a base station and mobile stations.

In a known MCA (multi channel access) system for radio communication between a base station and mobile stations, one of separated radio channels is prechosen as a control channel and the others are used as speech channels. The control channel is used for transmitting various non-speech signals such as an originating call signal, a terminating call signal, and control signals of circuit assignment and billing information. The control channel and the speech channels are separated by guard bands to prevent interferences between the adjacent channels. In this known system, when the control channel is exposed to a disturbance or jamming, it tends to be difficult to maintain desired signal transmision via the control channel. Further, in this known system, the guard bands between the control channel and the speech channels are unused.

SUMMARY OF THE INVENTION

It is an object of this invention to provide an improved method of radio communication.

It is another object of this invention to provide an improved system for radio communication.

According to a first aspect of this invention, in radio communication wherein a pair of a control signal and a speech signal is transmitted, a method comprises the steps of converting the control signal into a corresponding RF control signal having a frequency-hopping spread frequency spectrum of separated components lying in respective guard bands between predetermined speech channels; transmitting the RF control signal; converting the speech signal into a corresponding RF speech signal; and transmitting the RF speech signal via one of the speech channels.

According to a second aspect of this invention, in radio communication wherein a pair of a control signal and a speech signal is transmitted, a method comprises the steps of converting the control signal into a corresponding RF control signal having a spread frequency spectrum lying outside predetermined speech channels; transmitting the RF control signal; converting the speech signal into a corresponding RF speech signal; and transmitting the RF speech signal via one of the speech channels.

According to a third aspect of this invention, in radio communication wherein a pair of a control signal and a speech signal is transmitted, a system comprises means for converting the control signal into a corresponding RF control signal having a frequency spectrum of separated components lying in respective guard bands between predetermined speech channels; means for transmitting the RF control signal; means for converting the speech signal into a corresponding RF speech signal; and means for transmitting the RF speech signal via one of the speech channels.

According to a fourth aspect of this invention, in radio communication wherein a pair of a control signal and a speech signal is transmitted, a system comprises means for converting the control signal into a corresponding RF control signal having a spread frequency spectrum lying outside predetermined speech channels; means for transmitting the RF control signal; means for converting the speech signal into a corresponding RF speech signal; and means for transmitting the RF speech signal via one of the speech channels.

DESCRIPTION OF THE PREFERRED EMBODIMENT

Figure 1:
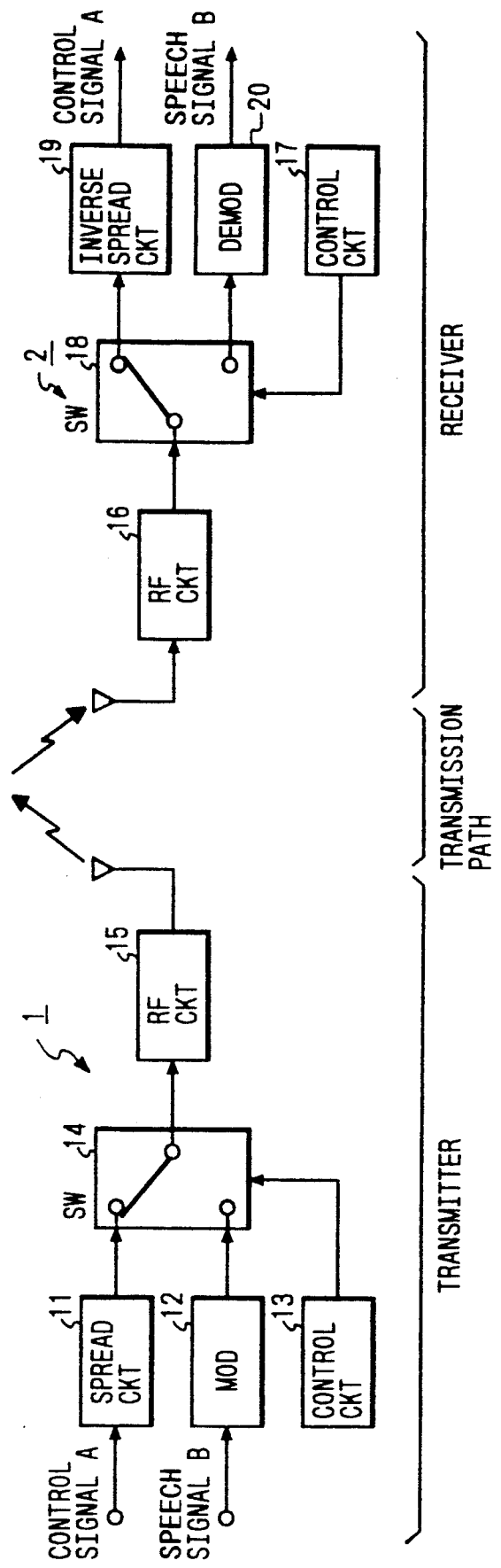
FIG. 1 is a block diagram of a radio communication system according to an embodiment of this invention.
Figure 2:
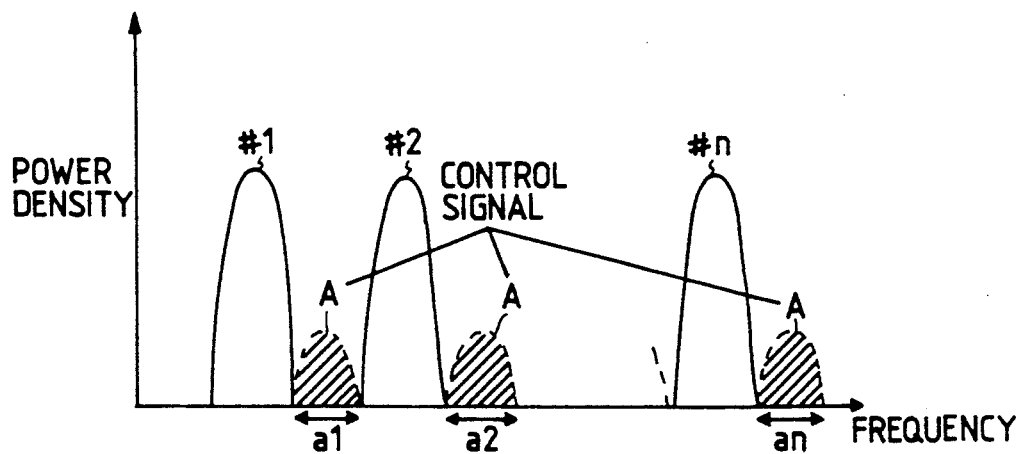
FIG. 2 is a frequency-domain diagram showing speech channels and guard bands in the radio communication system of FIG. 1.

With reference to FIG. 1, a system for radio communication includes a transmitter 1 and a receiver 2 which are connected via a transmission path. In the radio communication system, a plurality of speech channels #1, #2, . . . , #n are prepared as shown in FIG. 2. The speech channels #1-#n have different frequency bands and are separated by guard bands a1, a2, . . . , an.

As shown in FIG. 1, the transmitter 1 includes a spectrum spread circuit 11, a frequency modulator or a phase modulator 12, a control circuit 13, a switch 14, and an RF circuit 15. A control signal A such as an originating call signal or a terminating call signal is subjected to spread spectrum modulation by the spread spectrum circuit 11, being converted into a corresponding spread spectrum RF control signal applied to the switch 14. A speech signal B is subjected to frequency modulation or phase modulation by the modulator 12, being converted into a corresponding modulated RF speech signal applied to the switch 14. The switch 14 selects one of the spread spectrum RF control signal and the modulated RF speech signal in response to an output signal from the control circuit 13, and transmits the selected RF signal to the RF circuit 15. For example, the output signal from the control circuit 13 is designed so that the spread spectrum RF control signal and the modulated RF speech signal will be sequentially selected by the switch 14. The RF circuit 15 includes an RF power amplifier and filters. The RF signal transmitted to the RF circuit 15 is amplified by the RF power amplifier in the RF circuit 15 and is processed by the filters in the RF circuit 15, being fed from the RF circuit 15 to an antenna (no reference numeral) and being radiated from the antenna.

The spectrum spread circuit 11 is of the frequency hopping type, converting the control signal A into the RF control signal which has a spread frequency spectrum of separated components lying in the respective guard bands a1-an between the speech channels #1-#n as shown in FIG. 2. It should be noted that the spectrum of the RF control signal may lie in preselected ones of the guard bands a1-an.

The transmitter 1 selects one of the speech channels #1-#n, and transmits the modulated RF speech signal via the selected speech channel.

Figure 3:
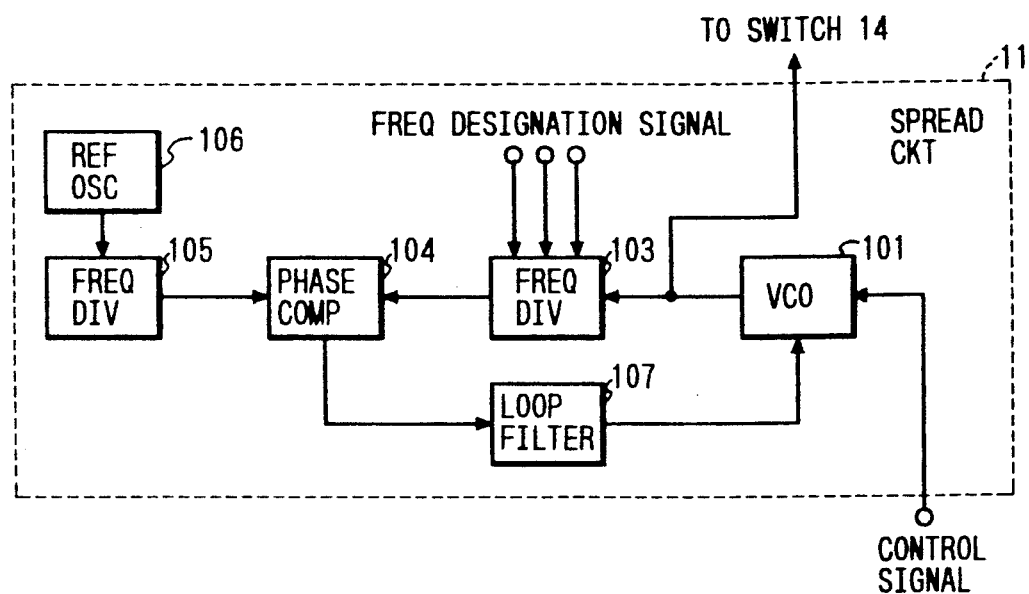
FIG. 3 is a block diagram of the spectrum spread circuit of FIG. 1.

The spectrum spread circuit 11 and the switch 14 will be further described. The spectrum spread circuit 11 is composed of a frequency synthesizer. As shown in FIG. 3, the frequency synthesizer includes a voltage-controlled oscillator 101 receiving the control signal A. The voltage-controlled oscillator 101 outputs an RF signal which depends on the control signal A. A frequency divider 103 divides the frequency of the RF output signal from the voltage-controlled oscillator 101 by a periodically-changing number. The output signal from the frequency divider 103 is fed to a phase comparator 104. A frequency divider 105 divides the frequency of the output signal from a reference oscillator or a temperature-compensated crystal oscillator 106 by a predetermined number. The output signal from the frequency divider 105 is fed to the phase comparator 104. The phase comparator 104 compares the phases of the output signals from the frequency dividers 103 and 105, generating a voltage signal representing the difference between the phases of the output signals from the frequency dividers 103 and 105. The phase difference voltage signal is fed from the phase comparator 104 to the voltage-controlled oscillator 101 via a loop filter 107 as an oscillation control voltage signal.

The voltage-controlled oscillator 101, the frequency divider 103, the phase comparator 104, and the loop filter 107 compose a phase-locked loop, so that the frequency of the RF output signal from the voltage-controlled oscillator 101 depends on the dividing number by which the frequency-divider 103 divides the frequency of the RF output signal from the voltage-controlled oscillator 101. The dividing number is determined by a frequency designation signal fed to the frequency divider 103. The frequency designation signal periodically and sequentially changes among predetermined states corresponding to the frequencies of the guard bands a1-an, so that the frequency of the RF output signal from the voltage-controlled oscillator 101 periodically and sequentially hops among the guard bands a1-an. The change of the state of the frequency designation signal occurs at a predetermined short period. The frequency designation signal is generated by a suitable device such as a combination of a clock signal generator and a counter, or a microcomputer. The RF output signal from the voltage-controlled oscillator 101 is used as the RF control signal fed to the switch 14 (see FIG. 1).

It should be noted that the spectrum spread circuit 11 may be of a known type.

Figure 4:
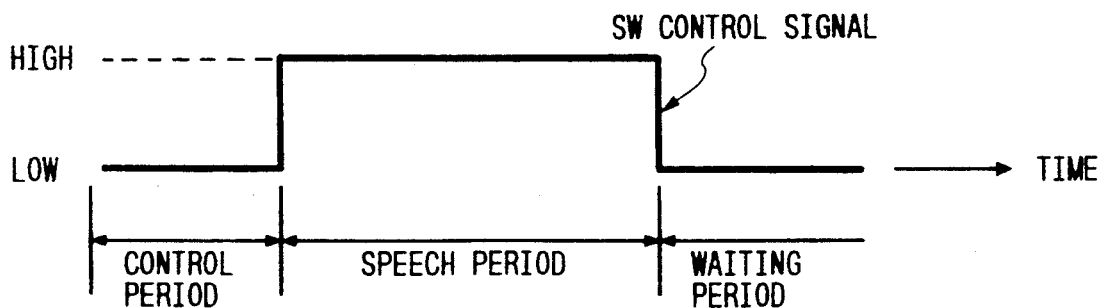
FIG. 4 is a time-domain diagram showing the waveform of a switch control signal in the radio communication system of FIG. 1.

As shown in FIG. 4, the switch control signal outputted from the control circuit 13 to the switch 14 changes between two different states. During an interval allotted to the transmission of control signals such as an originating call signal and a terminating call signal, the switch control signal assumes a low-level state so that the switch 14 selects the RF control signal outputted from the spectrum spread circuit 11. During a speech transmission interval following the control signal transmission interval, the switch control signal assumes a high-level state so that the switch 14 selects the modulated RF speech signal outputted from the modulator 12. When the speech transmission interval ends, the switch control signal returns to the low-level state.

It should be noted that the control circuit 13 may include a signal generator outputting a binary signal, the state of which changes in response to detection of the speech signal B.

The receiver 2 includes an RF circuit 16, a control circuit 17, a switch 18, an inverse spectrum spread circuit 19, and an FM (frequency modulation) demodulator or a PM (phase modulation) demodulator 20. An RF signal radiated from the antenna of the transmitter 1 is propagated via the transmission path, and is received by an antenna (no reference numeral) of the receiver 2. The RF signal received by the receiver antenna is fed to the RF circuit 16. The RF circuit 16 includes an amplifier and filters. The received RF signal is amplified by the amplifier in the RF circuit 16 and is processed by the filters in the RF circuit 16, being fed to the switch 18. The switch 18 selects one of the inverse spectrum spread circuit 19 and the demodulator 20 in response to an output signal from the control circuit 17, and transmits the received RF signal to the selected one of the devices 19 and 20. The output signal from the control circuit 17 is designed so that the switch 18 will transmit the RF signal from the RF circuit 16 to the inverse spectrum spread circuit 19 when the RF signal agrees with a spread spectrum RF control signal, and that the switch 18 will transmit the RF signal from the RF circuit 16 to the demodulator 20 when the RF signal agrees with a modulated RF speech signal. As a result, the spread spectrum RF control signal is fed to the inverse spectrum spread circuit 19, while the modulated RF speech signal is fed to the demodulator 20. The spread spectrum RF control signal is subjected to spread spectrum demodulation by the inverse spread spectrum circuit 19 so that an original control signal A is recovered from the spread spectrum RF control signal. The modulated RF speech signal is subjected to FM demodulation or PM demodulation by the demodulator 20 so that an original speech signal B is recovered from the modulated RF speech signal.

The switch control signal outputted from the control circuit 17 to the switch 18 changes between two different states. During an interval allotted to the transmission of control signals such as an originating call signal and a terminating call signal, the switch control signal assumes a low-level state so that the switch 18 feeds the RF signal from the RF circuit 16 to the inverse spectrum spread circuit 19. During a speech transmission interval following the control signal transmission interval, the switch control signal assumes a high-level state so that the switch 18 feeds the RF signal from the RF circuit 16 to the demodulator 20. When the speech transmission interval ends, the switch control signal returns to the low-level state.

It should be noted that the control circuit 17 may include a signal generator outputting a binary signal, the state of which changes in response to detection of an end of the control signal A.

The radio communication system of FIGS. 1 and 2 has the following advantages. Since the guard bands a1-an between the speech channels #1-#n are used for the transmission of the control signal A as understood from the previous description, frequencies are efficiently used. Since the control signal A is transmitted in a spread spectrum manner, a reliable transmission of the control signal A is enabled against a disturbance and jamming.

The radio communication system of FIGS. 1 and 2 may be modified as follows. In a modified system, the spread spectrum RF control signal has a spread spectrum lying in a band which extends outside the speech channels #1-#n and which differs from the guard bands a1-an between the speech channels #1-#n. In the modified system, a spectrum spread circuit 11 may be of the type other than the frequency hopping type.

What is claimed is:

1. In a method of spread-spectrum radio communication wherein a control signal and a speech signal are transmitted together, an improvement comprising the steps of:

converting only the control signal into a corresponding RF control signal having a spread frequency spectrum of separated components lying in respective bands between predetermined speech channels;

transmitting the RF control signal via at least one of said bands;

converting the speech signal into a corresponding RF speech signal; and transmitting the RF speech signal via at least one of the predetermined speech channels.

2. The method of claim 1 further comprising the steps of receiving the transmitted RF control signal; recovering the original control signal from the received RF control signal; receiving the transmitted RF speech signal via the at least one of the predetermined speech channels; and recovering the original speech signal from the received RF speech signal.

3. The method of claim 1 wherein said step of converting the control signal comprises using frequency hopping to convert the control signal to a frequency hopped RF control signal.

4. The method of claim 3 wherein said bands lie within guard bands separating said predetermined speech channels and the step of transmitting the frequency hopped RF control signal comprises transmitting the frequency hopped RF control signal via at least one of said guard bands separating said predetermined speech channels.

5. The method of claim 1 wherein said step of converting the speech signal into a corresponding RF speech signal comprises frequency modulating the speech signal.

6. In a spread-spectrum radio communication apparatus wherein a control signal and a speech signal are transmitted together, a system comprising:

means for converting only the control signal into a corresponding RF control signal having a spread frequency spectrum of separated components lying in respective bands between predetermined speech channels;

means for transmitting the RF control signal;

means for converting the speech signal into a corresponding RF speech signal; and means for transmitting the RF speech signal via one of the predetermined speech channels.

7. The system of claim 5 further comprising means for receiving the transmitted RF control signal; means for recovering the original control signal from the received RF control signal; means for receiving the transmitted RF speech signal via the one of the predetermined speech channels; and means for recovering the original speech signal from the received RF speech signal.

8. In frequency-hopped radio communication in a given FM transmission system, wherein a control signal and a speech signal are transmitted together, a method comprising the steps of:

converting only the control signal into a corresponding RF control signal having a spread frequency spectrum of separated components lying in respective bands separate from predetermined speech channels;

transmitting the RF control signal via at least one of said bands;

converting the speech signal into a corresponding RF speech signal; and transmitting the RF speech signal via at least one of the predetermined speech channels.

9. The method of claim 8 wherein said bands lie within guard bands separating said predetermined speech channels and the step of transmitting the RF control signal comprises transmitting the RF control signal via at least one of said guard bands separating said predetermined speech channels.

10. The method of claim 8 wherein said means for converting comprises frequency hopping means using frequency hopping to convert the control signal to a frequency hopped RF control signal.

11. In a transmission system for frequency-hopped FM radio communication, wherein a control signal and a speech signal are transmitted together, an apparatus comprising:

means for converting only the control signal into a corresponding RF control signal having a spread frequency spectrum of separated components lying in respective bands separate from predetermined speech channels;

means for transmitting the RF control signal via at least one of said bands;

means for converting the speech signal into a corresponding RF speech signal; and means for transmitting the RF speech signal via one of the predetermined speech channels.

12. The system of claim 11 wherein said bands lie within guard bands separating said predetermined speech channels and said means for transmitting the RF control signal comprises means for transmitting the RF control signal via at least one of said guard bands separating said predetermined speech channels.

* * * * *